United States Patent [19]

Meier

[11] Patent Number: 4,491,435

[45] Date of Patent: Jan. 1, 1985

[54] JOINTED STAND

[75] Inventor: Hans Meier, Mellingen, Switzerland

[73] Assignee: Automated Medical Products Corporation, New York, N.Y.

[21] Appl. No.: 514,922

[22] Filed: Jul. 18, 1983

[51] Int. Cl.³ .................. F16C 11/06; E04G 3/00
[52] U.S. Cl. ............................. 403/55; 403/56; 403/90; 248/276; 248/288.5; 248/DIG. 4
[58] Field of Search .............. 403/55, 56, 63, 90, 403/122; 248/122, 288.5, 276, DIG. 4

[56] References Cited

U.S. PATENT DOCUMENTS

| 3,910,538 | 10/1975 | Baitella | 248/122 |
| 4,143,652 | 3/1979 | Meier et al. | 128/20 |
| 4,236,844 | 12/1980 | Mantele | 248/276 X |
| 4,402,481 | 9/1983 | Sasaki | 403/55 X |
| 4,431,329 | 2/1984 | Baitella | 403/55 |

FOREIGN PATENT DOCUMENTS

| 2717828 | 10/1978 | Fed. Rep. of Germany | 403/55 |
| 608874 | 1/1979 | Switzerland | 403/55 |

Primary Examiner—Cornelius J. Husar
Assistant Examiner—Todd G. Williams
Attorney, Agent, or Firm—Werner W. Kleeman

[57] ABSTRACT

The jointed stand comprises two joint or swivel heads coupled to each other and two arms each extending from a related one of the joint heads and terminating in a respective ball-and-socket joint. Each ball-and-socket joint is operatively associated with a push or thrust rod which slidably extends through the related arm and cooperates with a related transmission or transfer member in the associated joint or swivel head. Each transfer or displacement member has two oppositely inclined surfaces on opposite sides thereof which are supported at an associated end of the related push rod and at the joint head, respectively, by means of roller bodies. A hinge pin extends through the transmission members with clearance. A tightening element coacts with the hinge pin in order to be able to cam the transmission members at the roller bodies, so as to be able to selectively positively lock in place the arms and ball-and-socket joints and, when desired, to quickly release such locking action.

5 Claims, 6 Drawing Figures

4,491,435

JOINTED STAND

BACKGROUND OF THE INVENTION

The present invention relates to a new and improved construction of a jointed stand or joint support structure.

In its more particular aspects the jointed stand or the like of the present development is of the type comprising a pivot joint arrangement containing two joint or swivel heads, each having a coupling face or surface. The joint or swivel heads are arranged with the coupling surfaces facing each other. A common hinge pin passes through the joint or swivel heads. Tightening means act upon the hinge pin in order to press the joint or swivel heads against each other for locking the pivot joint arrangement. Two tube-like arms or arm members are interlinked by the pivot joint arrangement. Each arm has two oppositely located ends, one end facing the pivot joint arrangement and being anchored thereto and the other end carrying a hinge structure comprising a hinge element, a fixture for the hinge or joint element and a socket or seat for the hinge or joint element. Two thrust or push rods are provided, each of which extends through its related arm up to the associated joint or swivel head, and each such thrust or push rod can be displaced within the related arm thereof. The socket for the hinge element is mounted at the push rod. A transfer or transmission member is provided which possesses a first inclined surface or face. This transfer or transmission member is displaceable in the lengthwise direction of the common hinge pin by the tightening means and also in the direction of the related fixture and acts upon a neighboring end of the related push rod in order to displace the same in the direction of the fixture, so as to simultaneously lock the hinge or joint element with the pivot joint arrangement.

In a known jointed stand of this general type, as for example described in U.S. Pat. No. 3,910,538, granted Oct. 7, 1975, (see FIGS. 10 to 12 thereof), each of the push or thrust rods extending into the joint head is provided with a ring through which passes the hinge pin with clearance. A tightening nut is screwed on to one end of the hinge pin and the other end of such hinge pin is mounted to be longitudinally displaceable in the corresponding joint head. At the region of the last-mentioned joint head a conical transfer or transmission element is positioned upon the hinge pin. A further conical transmission or transfer element is displaceably mounted on the hinge pin at the region thereof which is positioned in the other joint head. The last mentioned transfer element is supported at the tightening nut by means of a thrust sleeve. The two transfer or transmssion members confront each other at their smaller diameters and only contact one point at the inner diameter of the rings mounted to the inner ends of the push rods by means of a generatrix of their conical surface. When the tightening nut is tightened the two transfer elements are positively moved towards each other. Consequently, the rings and in conjunction therewith the thrust or push rods are outwardly displaced and the two joint heads are pressed against each other by means of the rings. Thus, the pivot joint and simultaneously therewith the joints at the ends of the arms are locked. Also significant in this regard is U.S. Pat. No. 4,143,652, granted Mar. 13, 1979.

It is a disadvantage of this state-of-the-art arrangement that the hinge pin not only must take-up the axial force needed for pressing the two joint heads against each other, but also the shearing forces or loads originating from the co-action of the conical transfer elements with the rings at the push rods. Consequently, the hinge pin of the known jointed stand tends to cant, so that the conical transfer element which is displaceable upon the hinge pin may seize or bind thereon. Therefore, in such prior art jointed stand there are provided springs, each of which act upon the push rod and tend to move the same away from the associated fixture for the joint or hinge element located at the end of the respective arm. For locking the joints, this jointed stand also requires an additional force for overcoming the force of such spring.

According to a further prior art construction of jointed stand or joint support structure as known, for example, from U.S. Pat. No. 4,236,844, granted Dec. 2, 1980, (see FIGS. 2 to 9 thereof), each joint head is designed in a case-like manner and comprises a cup portion and a cover portion which can be displaced to a greater or lesser extent into the cup portion. Both the cup portions or members snugly engage each other at their base portions. The hinge pin is anchored to one of the cover portions and extends through both cup portions and the other cover portion and at that location carries an eccentrically arranged tightening lever by means of which the two cover portions may be displaced towards each other. Each cover portion has a wedge threadably connected thereto at the side thereof facing the internal space. The wedge or inclined face of the wedge member acts upon two rolls extending to both sides of the hinge pin and at right angles thereto. Both of the rolls act, on the other hand, upon another wedge member displaceable within the cup portion and formed in mirror-image relationship to the wedge member threadably connected to the cover portion, the inner end of the push rod engaging the displaceable wedge member. When the eccentric tightening lever is tightened, i.e. when the two cover portions are displaced towards each other, the threadably connected wedge member displaces the rolls in the direction of the other wedge member which then displaces the push rod towards the outside. At the same time the two rolls press the two cup portions at their bases against each other, so that the pivot joint is simultaneously locked along with the joints at the free ends of the arms.

In this prior art jointed stand construction the hinge pin practically only takes-up tension forces or loads, whereas the force originating from the push rods is supported in the cover portion of the corresponding joint head. On the other hand, each joint head comprises members (cup portion and cover portion) which are displaceable relative to each other and which design, in the case of contamination or soiling, may impair operability of the device. Additionally, upon tightening the eccentric tightening lever, the displaceable wedge member is also displaced transversely with respect to the push rod and this displacement is opposed by the friction prevailing between the cover portion and the displaceable wedge member bearing against the cover portion.

SUMMARY OF THE INVENTION

Therefore, with the foregoing in mind it is a primary object of the present invention to provide a new and improved construction of a jointed stand or the like which is not associated with the aforementioned drawbacks and limitations of the prior art constructions described hereinbefore.

Another important object of the present invention is directed to a new and improved construction of a jointed stand or the like for supporting an apparatus or object and enabling selective positioning and fixation into a desired position of such apparatus or object, wherein the jointed stand is constructed such that the apparatus or object can be positionally fixed into a desired location in an extremely rapid and easy manner and then positively locked in the selected position.

Still a further significant object of the present invention is directed to a new and improved constructed of a jointed stand for supporting a desired object or the like which can be selectively positionally adjusted so as to assume a predetermined position and positively locked in such predetermined position, which jointed stand is relatively simple in construction and design, extremely easy to use, enables undertaking relatively quick readjustments of the object and positive fixation thereof into the selected position without requiring complicated manipulations, and can withstand considerable loads without there resulting any undesirable shifting of the object.

A further important object of the present invention is directed to an improved construction of jointed stand or the like which is relatively simple in design, quite economical to manufacture, extremely reliable in operation, not readily subject to breakdown or malfunction, and requires a minimum of maintenance and servicing.

Now in order to implement these and still further objects of the invention, which will become more readily apparent as the description proceeds, the jointed stand of the present development is manifested by the features that, the hinge pin extends through the transfer or transmission member with clearance and the transfer or transmission member possesses a second inclined or sloped surface which is located at the side of the transmission member disposed opposite to the side of the first inclined or sloped surface and inclined opposite thereto, and the second inclined surface is supported within the joint head by means of a roller body.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components for the different exemplary embodiments herein described and wherein.

DETAILED DESCRIPTION OF THE PREFERRED EMBODIMENTS

Describing now the drawings, it is to be understood that for purposes of simplifying the illustration thereof only enough of the construction of the jointed stand or the like has been illustrated as needed for those skilled in the art to readily understand the underlying principles and concepts of the present development, while simplifying the showing of the drawings.

Figure 1:
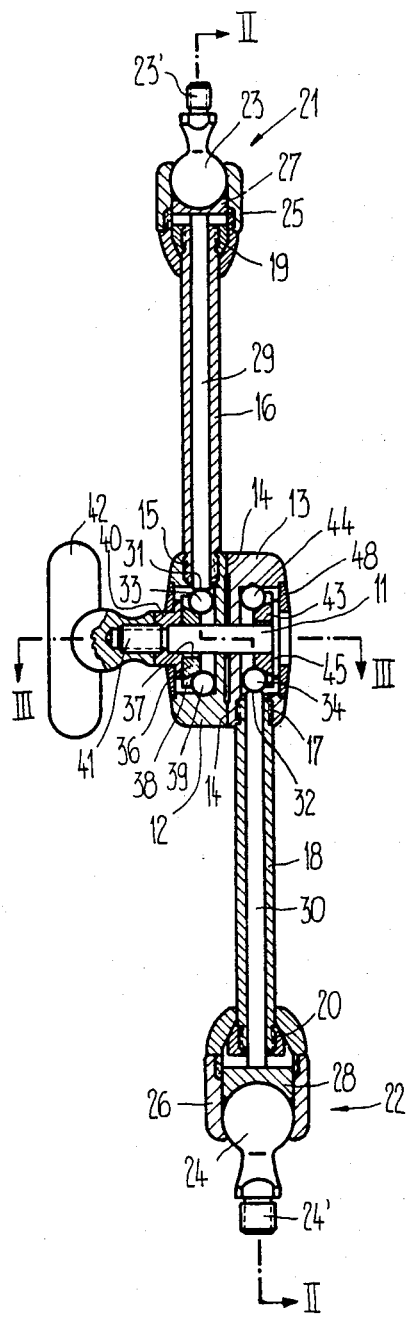
FIG. 1 shows a longitudinal section through a first embodiment of the jointed stand according to the present invention.
Figure 2:
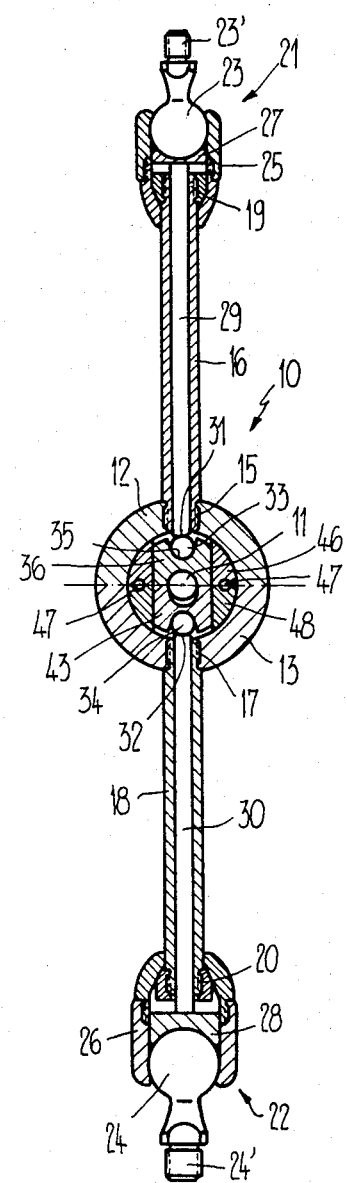
FIG. 2 is a sectional view taken substantially along the line II—II of FIG. 1.
Figure 3:
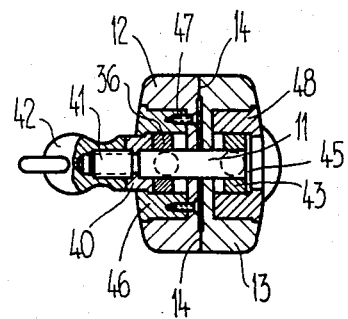
FIG. 3 is a section along the line III—III in FIG. 1.

Turning now to FIGS. 1 to 3 of the drawings, a first preferred exemplary embodiment of the jointed stand 10 or the like constructed according to the invention has been shown and will be seen to comprise a pivot or swivel joint arrangement containing a hinge or pivot pin 11 interconnecting two joint or swivel heads 12 and 13, each of which possesses a coupling surface or face 14. The joint or swivel heads 12 and 13 contact each other at their coupling surfaces 14. One end 15 of a tube-like or tubular arm 16 is threadably connected or screwed into the joint or swivel head 12. One end 17 of a further tube-like or tubular arm 18 is threadably connected or screwed into the other joint or swivel head 13. Joints or joint structures here constituted by ball-and-socket joints 21 and 22 are each mounted to one respective further end 19 and 20 of the arms or arm members 16 and 18, respectively. These ball-and-socket joints 21 and 22 each comprise a substantially ball-shaped joint or hinge element 23 and 24 containing threaded pins 23' and 24' formed at the respective joint or hinge element 23 and 24, a respective ball fixture 25 and 26 or the like each threadably connected or screwed onto the respective end 19 and 20, and ball sockets or seats 27 and 28 enclosed by the related ball fixture 25 and 26.

Each of the ball sockets or seats 27 and 28 is anchored to a related thrust or push rod 29 and 30, respectively. These thrust or push rods 29 and 30 each displaceably extend through their related arm or arm member 16 and 18 into their associated joint or swivel head 12 and 13. The inner ends 31 and 32 of the thrust or push rods 29 and 30, respectively, are each supported at a suitable roller or rolling body, in this case a ball or spherical member 33 and 34, respectively, which is disposed internally of the related joint or swivel head 12 and 13. The ball 33 is guided in an inclinedly extending groove or depression 35 (see FIG. 2) having a substantially semi-circular cross-sectional configuration. The groove or depression 35 is formed in a transfer or transmission member 36 displaceably mounted on the hinge or pivot pin 11.

The transfer or transmission member 36 contains an elongated hole or opening 37 through which extends the hinge pin 11, so that such transfer member 36 also is displaceable to a limited extent transversely with respect to the hinge pin 11. At the side opposite to the groove 35 the transmission member 36 possesses another groove 38 which is inclined opposite to the groove 35, i.e. is the mirror-image thereof, but has the same profile. A further ball 39 is guided in this mirror-image configured groove 38 and is supported at the inner wall of the joint or swivel head 12. In the axial direction of the hinge or pivot pin 11 the transfer or transmission member 36 is supported at a thrust sleeve 40 which is displaceably mounted upon the hinge pin 11. This thrust sleeve 40 is supported at a tightening nut 42 or the like threadably connected or screwed onto the externally threaded end 41 of the hinge pin 11.

The support of the ball 44 in the other joint or swivel head 13 is accomplished by structure which is analogous to that just described with respect to the joint or swivel head 12, so that the ensuing description may be here restricted to details of the corresponding transfer or transmission member 43 and the related ball 44. This transfer or transmission member 43 which is similarly constructed to the transfer or transmission member 36, but which is installed in a mirror-image relationship thereto, is supported and retained in axial direction at a head member or head 45 which is formed at the end of the hinge pin 11 located opposite to the other end 41 thereof.

It will be understood from FIG. 3 that the thrust sleeve 40 in the joint head 12 is undetachably retained therein by means of a retaining or holder member 46 which is secured thereto by means of threaded screws or bolts 47 or the like extending from the coupling surface or face 14 of the joint or swivel head 12. The head 45 of the hinge or pivot pin 11 is secured by a corresponding retaining or holder member 48. Therefore, the pivot joint essentially composed of the hinge pin 11 and the joint or swivel heads 12 and 13 does not readily fall apart even if the tightening nut 42 or the like is completely loosened.

The operation and use of the jointed stand described hereinbefore with reference to FIGS. 1 to 3 is as follows:

The threaded pin 24' is threaded or screwed into a suitable holding element (not shown) provided with a corresponding threaded bore and which may be, for example, constituted by a foot member, a holding block or the like. The object or apparatus to be held by the jointed stand is threadably connected to the other threaded pin 23', if required by using a suitable intermediate element or adapter. Such an object or apparatus may be, for example, constituted by a camera, a measuring instrument, a tool or also an auxiliary device for medical purposes like, for example, a retractor or cassette holder for X-ray film.

As long as the tightening nut 42 is not tightened the jointed stand 10 is readily movable much in the manner of a human arm, whereby the ball-and-socket joint 22 approximately corresponds to the shoulder joint, the pivot joint arrangement 11, 12, 13 to the elbow joint and the ball-and-socket joint 21 to the wrist joint. Upon tightening the tightening nut 42 or equivalent structure the transmission or transfer members 36 and 43 are positively pressed towards each other. The transmission or transfer member 36 then moves in rolling contact with the ball or spherical member 39 and is displaced somewhat in the direction of the ball or spherical member 33. This displacement is also transferred to the ball 33 which, however, is additionally displaced further in the direction of the push or thrust rod 29 by rolling along the groove or depression 35. This displacement or shifting movement is transferred by the push or thrust rod 29 to the ball socket or seat 27, so that the ball element 23 is securely clamped between the fixture 25 and the socket or seat 27. Hence, the ball-and-socket joint 21 is now firmly locked in place. In analogous fashion the same simultaneously occurs by means of the action of the transmission or transfer member 43 in co-action with the balls 44 and 34, the push or thrust rod 30 and the ball socket or seat 28, whereby the ball-and-socket joint 22 also is blocked or locked in place. Furthermore, when the tightening nut 42 is tightened, the transmission or transfer members 36 and 43, by means of the balls 33, 39 and 34, 44, respectively, press the joint or swivel heads 12 and 13 against one another at their coupling surfaces 14, thus blocking the pivot joint formed the hinge pin 11 and by the two joint or swivel heads 12 and 13. Consequently, the jointed stand 10 forms a stable and rigid structure which is capable of reliably and fixedly retaining in any desired position the object or apparatus threadably connected to the threaded pin 23' when the tightening nut 42 is tightened.

Figure 6:
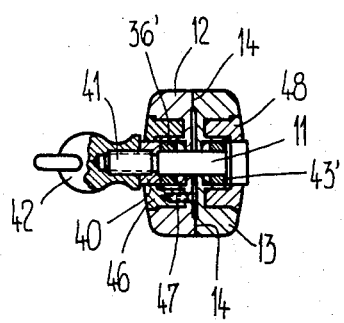
FIG. 6 is a sectional view taken substantially along the line VI—VI of FIG. 4.
Figure 4:
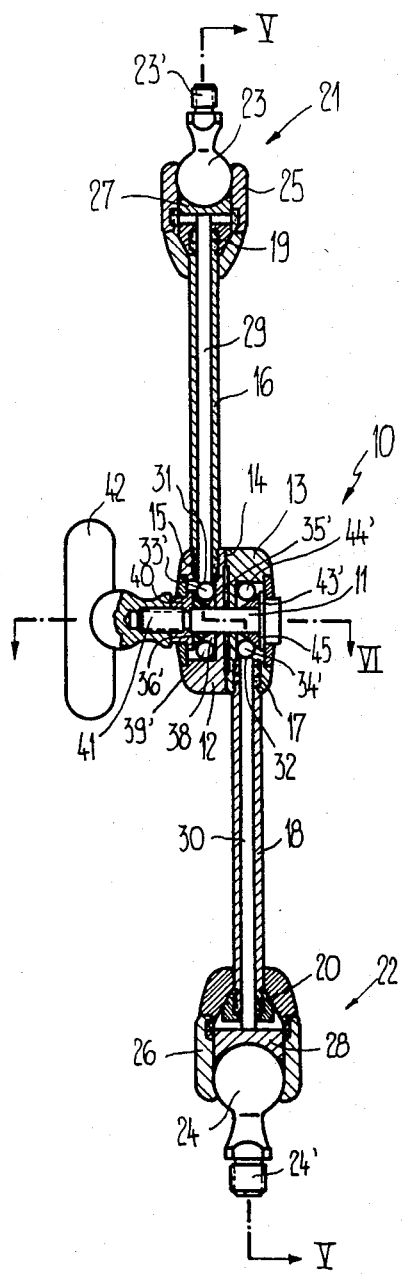
FIG. 4 shows a longitudinal section through a second embodiment of the jointed stand according to the present invention.
Figure 5:
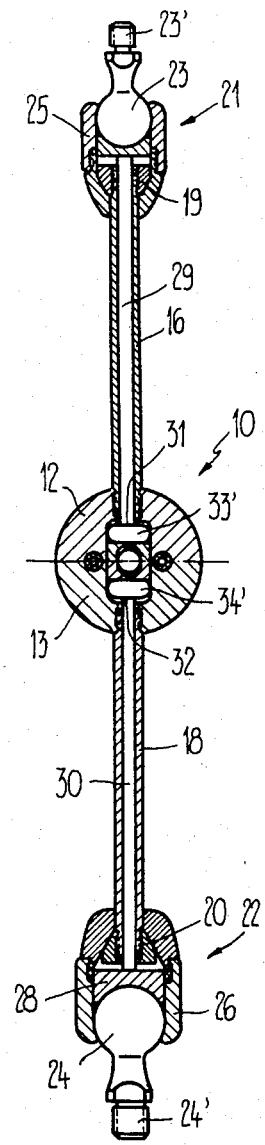
FIG. 5 is a secontional view taken substantially along the line V—V of FIG. 4.

The second embodiment of jointed stand 10 according to the invention, which is shown in FIGS. 4 through 6 is constructed very similar to the embodiment shown and described previously with reference to FIGS. 1 to 3. Therefore, components of the same or essentially the same design have generally been designated by the same reference numerals as employed in the arrangement of FIGS. 1 to 3. Reference is again made to the description of such components or elements as given heretofore, so that a further description thereof is not here required. In the exemplary embodiment depicted in FIGS. 4 to 6, the inner ends 31 and 32 of the push or thrust rods 29 and 30, respectively, are not supported at balls or spherical members but at substantially cylindrical rollers 33' and 34', respectively. These rollers 33' and 34' are supported at a respective planar sloped or inclined surface 35' formed at a related transmission or transfer member 36' or 43', respectively. These transmission or transfer members 36' and 43' also each have a not particularly referenced elongated hole or slot through which extends the hinge pin 11. On their sides opposite to the sloped or inclined surface 35' other inclined surfaces or faces 38' are formed at the same but opposite angle i.e. in mirror-image fashion, which bear upon a further related roller 39' and 44', respectively.

The mode of operation of this embodiment corresponds to a large extent to the mode of operation described for the first embodiment shown and described with reference to FIGS. 1 to 3. Transfer of the tightening force originating from the tightening nut 42 to the push or thrust rods 29 and 30 and to the joint or swivel heads 12 and 13 here, however, occurs along lines or, in other words, in linear contact, whereas in the embodiment as shown in FIGS. 1 to 3 the transfer of such force occurs at point-like contact locations of the balls with the related transmission or transfer member or joint or swivel head, as the case may be.

It has been found that by selecting an appropriate material like, for instance, stainless steel for fabricating all of the components or elements, the jointed stands as described hereinbefore are outstandingly suitable for medical purposes since they may be readily sterilized without losing their functional capabilities.

While there are shown and described present preferred embodiments of the invention, it is to be distinctly understood that the invention is not limited thereto, but may be otherwise variously embodied and practiced within the scope of the claims. Accordingly,

What I claim is:

1. A jointed stand comprising:
   a pivot joint arrangement comprising two joint heads each having a coupling surface;
   said joint heads being arranged such that said coupling surfaces confront one another;
   said pivot joint arrangement further comprising a common hinge pin passing through said joint heads;

tightening means acting upon said hinge pin in order to press said joint heads against each other for locking said pivot joint arrangement;

two substantially tube-like arms interlinked by said pivot joint arrangement;

each of said two arms having two ends;

one of said two ends of each arm facing a respective one of said joint heads and being anchored thereto;

the other one of said two ends of each arm carrying a respective joint;

each said joint comprising a joint element, a fixture for said joint element and a socket for said joint element;

two push rods each having first and second opposite ends and each extending through a respective one of said two arms to a related one of said joint heads and being displaceable within its related arm;

each of said sockets being mounted to said first end of a related one of said push rods;

a respective transmission member provided for each push rod and each transmission member possessing a first inclined surface;

said transmission members being displaceable in the lengthwise direction of said hinge pin by said tightening means;

each said transmission member being arranged to act upon said second end of its related push rod in order to displace the same in the direction of said fixture in order to lock said joint element with said pivot joint arrangement;

said hinge pin extending through said transmission members with clearance;

each said transmission member possessing a second inclined surface;

said second inclined surface being located at a side of said transmission member located opposite to the side of said first inclined surface and being oppositely inclined with respect to said first inclined surface; and a respective roller body for supporting each said second inclined surface within the related joint head.

2. A jointed stand comprising:

a pivot joint arrangement comprising two joint heads each having a coupling surface;

said joint heads being arranged such that said coupling surfaces confront one another, said pivot joint arrangement further comprising a common hinge pin passing through said joint heads;

tightening means acting upon said hinge pin in order to press said joint heads against each other for locking said pivot joint arrangement;

two substantially tube-like arms interlinked by said pivot joint arrangement;

each of said two arms having two ends;

one of said two ends of each arm facing a respective one of said joint heads and being anchored thereto;

the other one of said two ends of each arm carrying a respective joint;

each said joint comprising a joint element, a fixture for said joint element and a socket for said joint element;

two push rods each having first and second opposite ends and each extending through a respective one of said two arms to a related one of said joint heads and being displaceable within its related arm;

each of said sockets being mounted to said first end of a related one of said push rods;

a respective transmission member provided for each push rod and each transmission member possessing a first inclined surface;

said transmission members being displaceable in the lengthwise direction of said hinge pin by said tightening means;

each said transmission member being arranged to act upon said second end of its related push rod in order to displace the same in the direction of said fixture in order to lock said joint element with said pivot joint arrangement;

said hinge pin extending through said transmission members with clearance;

each said transmission member possessing a second inclined surface;

said second inclined surface being located at a side of said transmission member located opposite to the side of said first inclined surface and being oppositely inclined with respect to said first inclined surface;

a respective roller body for supporting each said second inclined surface withing the related joint head;

a respective further roller body interposed between said second end of each push rod and the related transmission member; and said first inclined surface of each transmission member acting upon said second end of said push rod by means of said further roller body.

3. The jointed stand as defined in claim 2, wherein:

said roller bodies comprise rollers;

said inclined surfaces of each transmission member defining substantially planar mirror-image arranged inclined surfaces; and each said transmission member having an elongated hole through which passes said common hinge pin.

4. The jointed stand as defined in claim 2, wherein:

said roller bodies comprise balls; and said inclined surfaces of each transmission member defining guide grooves of substantially semi-circular cross-section inclined in mirror-image relationship at opposite sides of said transmission member.

5. The jointed stand as defined in claim 4, wherein:

each said transmission member is guided for limited displacement within its related joint head substantially in parallelism to a predetermined direction of displacement of its related push rod.

* * * * *

UNITED STATES PATENT AND TRADEMARK OFFICE
CERTIFICATE OF CORRECTION

PATENT NO. : 4,491,435

DATED : January 1, 1985

INVENTOR(S) : HANS MEIER

It is certified that error appears in the above-identified patent and that said Letters Patent is hereby corrected as shown below:

Column 6, line 4, after "formed" please insert --by--

Signed and Sealed this

Sixteenth Day of July 1985

[SEAL]

Attest:

DONALD J. QUIGG

Attesting Officer     Acting Commissioner of Patents and Trademarks